(12) United States Patent
Shabbir et al.

(10) Patent No.: US 11,231,075 B2
(45) Date of Patent: Jan. 25, 2022

(54) TRANSMISSION DEVICE

(71) Applicant: Ningbo Geely Automobile Research & Development Co., Ltd., Ningbo (CN)

(72) Inventors: Adil Shabbir, Hisings Backa (SE); Eva Barrientos Blanco, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 29 days.

(21) Appl. No.: 16/820,566

(22) Filed: Mar. 16, 2020

(65) Prior Publication Data

US 2020/0217373 A1 Jul. 9, 2020

Related U.S. Application Data

(63) Continuation of application No. PCT/CN2018/105251, filed on Sep. 12, 2018.

(30) Foreign Application Priority Data

Sep. 27, 2017 (EP) .................................... 17193607

(51) Int. Cl.
   *F16D 23/02* (2006.01)
   *F16H 3/38* (2006.01)
   *F16D 23/06* (2006.01)
   *F16H 61/04* (2006.01)

(52) U.S. Cl.
   CPC ............ *F16D 23/025* (2013.01); *F16H 3/38* (2013.01); *F16D 2023/0625* (2013.01); *F16D 2023/0681* (2013.01); *F16H 61/0403* (2013.01)

(58) Field of Classification Search
   CPC .................................... F16D 23/02–2023/0693
   See application file for complete search history.

(56) References Cited

U.S. PATENT DOCUMENTS

| 5,343,993 A | 9/1994 | Soffa |
| 6,588,563 B1* | 7/2003 | Sarrach ................. F16D 23/025 192/53.34 |
| 2020/0224734 A1* | 7/2020 | Barrientos Blanco ...................... F16D 23/025 |

FOREIGN PATENT DOCUMENTS

| CN | 1135254 A | 11/1996 |
| CN | 2890509 Y | 4/2007 |
| CN | 101589244 A | 11/2009 |

(Continued)

OTHER PUBLICATIONS

International Search Report and written opinion for corresponding Patent Application No. PCT/CN2018/105251, dated Dec. 19, 2018, 5 pages.

(Continued)

*Primary Examiner* — David R Morris
(74) *Attorney, Agent, or Firm* — Tucker Ellis LLP

(57) ABSTRACT

A transmission device includes a first rotating member and a ring for synchronizing the first rotating member and a second rotating member relative to each other. The first rotating member is provided with a plurality of first recesses for receiving a plurality of protrusions provided on the synchronizing ring. The first rotating member has one said first recess for each of said protrusions. The first rotating member is provided with one or more second recesses making the total number of first and second recesses exceeding the number of said protrusions.

22 Claims, 5 Drawing Sheets

(56) References Cited

FOREIGN PATENT DOCUMENTS

| | | | |
|---|---|---|---|
| CN | 102438770 A | 5/2012 | |
| CN | 102644723 A | 8/2012 | |
| CN | 102777508 A | 11/2012 | |
| CN | 103775527 A | 5/2014 | |
| CN | 203822894 U | 9/2014 | |
| CN | 204041768 U | 12/2014 | |
| CN | 204200900 U | 3/2015 | |
| CN | 106195053 A | 12/2016 | |
| CN | 106545594 A | 3/2017 | |
| CN | 206092741 U | 4/2017 | |
| CN | 206377175 U | 8/2017 | |
| CN | 107120362 A | 9/2017 | |
| CN | 210050218 U | 2/2020 | |
| DE | 102005007647 A1 | 8/2006 | |
| EP | 2090796 A1 | 8/2009 | |
| EP | 2104790 A1 | 9/2009 | |
| KR | 20050118444 A | 12/2005 | |
| KR | 2017076829 A * | 7/2017 | ............. F16D 23/02 |
| WO | 2017080721 A1 | 5/2017 | |

OTHER PUBLICATIONS

European Search Report for corresponding European Application No. 17193607.3, dated May 28, 2018, 5 pages.

* cited by examiner

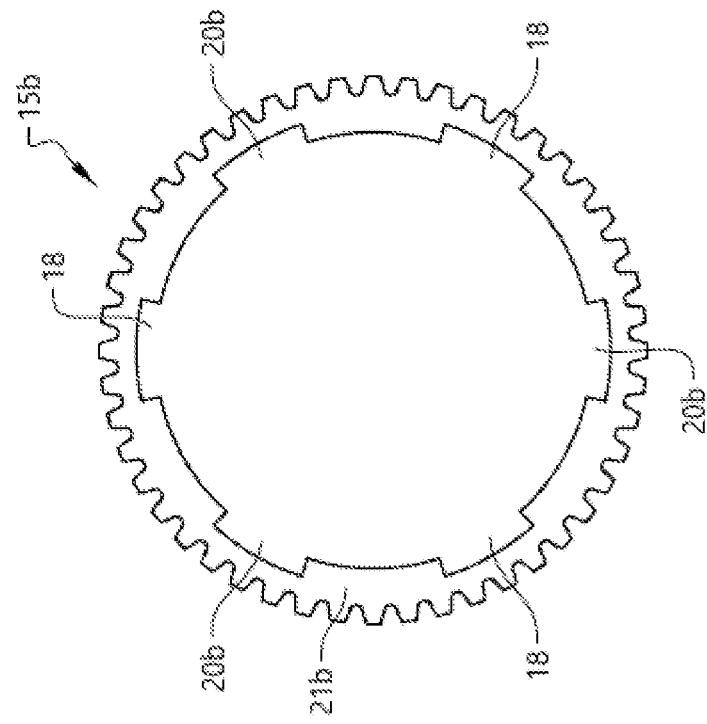
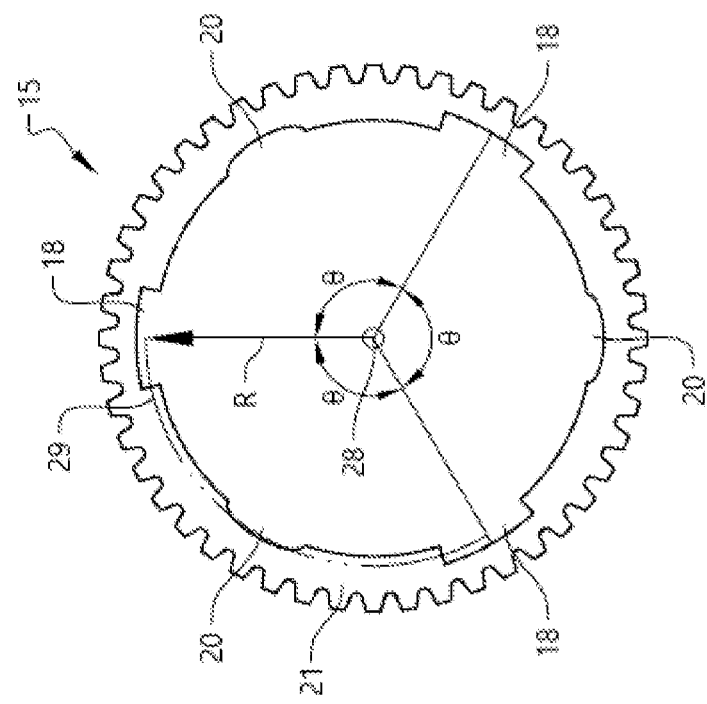
FIG. 4A
FIG. 4B

TRANSMISSION DEVICE

RELATED APPLICATION DATA

This application is a continuation of International Patent Application No. PCT/CN2018/105251, filed Sep. 12, 2018, which claims the benefit of European Patent Application No. 17193607.3, filed Sep. 27, 2017, the disclosures of which are incorporated herein by reference in their entireties.

TECHNICAL FIELD

The invention relates to a transmission device having a first rotating member and a ring for synchronizing the first rotating member and a second rotating member relative to each other. In addition, the invention relates to a synchronizer for a vehicle transmission, comprising such a transmission device.

BACKGROUND

Transmissions usually have synchronizers for shifting gears. For example, an idle gear wheel that is journaled on an output shaft and connected to a gear wheel arranged on an input shaft, can be connected to the output shaft by a synchronizer. The synchronizer has a sleeve that is brought into engagement with a dog ring of the idle gear wheel by means of teeth. The sleeve is connected to a hub by means of a spline joint. The hub is in turn rotationally locked relative to the output shaft. Thus, when the sleeve and the dog ring are engaged, the idle gear wheel and the output shaft are rotationally locked relative to each other via the synchronizer and torque can be transferred.

When shifting gears, before displacement of the sleeve for engaging the dog ring, the rotation speeds of the idle gear wheel and the sleeve have however to be synchronized. For this reason, friction rings can be used, and particularly an intermediate synchronizing ring provided with protrusions or cams for engagement with corresponding recesses or windows of the idle gear wheel can be used. Usually the recesses are arranged on the inside of the dog ring which can be welded onto a shaft extension of the idle gear wheel. During synchronisation, the intermediate ring is engaged with the dog ring and rotates with the idle gear wheel. When the idle gear wheel and the sleeve are synchronized, the sleeve is brought into engagement with the dog ring.

SUMMARY

An objective of the invention is to provide a transmission device enabling an improved torque transfer.

The objective is achieved by a transmission device that comprises a first rotating member and a ring for synchronizing the first rotating member and a second rotating member relative to each other, wherein the first rotating member is provided with a plurality of first recesses for receiving a plurality of protrusions provided on the synchronizing ring, and the first rotating member has one said first recess for each of said protrusions, and the first rotating member is provided with one or more second recesses making the total number of first and second recesses exceeding the number of said protrusions.

The invention is based on the insight that a first rotating member having relatively few recesses and a synchronizing ring having corresponding cams being sufficient for transferring torque during the synchronizing phase, may involve problems when the full torque is to be transferred by the first rotating member after synchronisation.

For example, if a first rotating member comprising a gear wheel and a gear wheel ring or a so-called dog ring that is welded to the gear wheel, where the dog ring has three recesses for instance, is compared to a first rotating member where the dog ring has six recesses for instance, the load distributions and the shapes of the dog rings will be different when transferring torque. The shape of the dog ring having a greater number of recesses will be more uniform and the deviation from the nominal distance between the teeth of the dog ring will be less. This in turn results in more uniform torque transfer that is independent of the engagement position between the dog ring and a second rotating member, such as a sleeve. In addition, weight will be reduced and the load distribution in welding seams between the gear wheel and the dog ring can be improved.

According to one embodiment, the first rotating member has at least two second recesses, and the second recesses are arranged symmetrically along a circumferential line of the first rotating member. Hereby, the second recesses will be distributed in a way improving the uniformity of the first rotating member when transferring torque.

According to another embodiment, the second recesses are arranged such that a circumferential distance between two adjacent second recesses is substantially the same for all second recesses. Hereby the uniformity of the first rotating member when transferring torque is further improved.

According to a further embodiment, the first rotating member comprises a gear wheel and a gear wheel ring being rotationally locked relative to each other for transferring torque between the gear wheel and the second rotating member via the gear wheel ring. The features of the invention can be advantageously used when the one or more second recesses (and the first recesses) are arranged in the gear wheel ring as described hereinabove.

According to another aspect of the invention, a further objective is to provide a synchronizer for a vehicle transmission enabling an improved torque transfer.

This objective is achieved by a synchronizer comprising a transmission device according to the invention.

The advantages of the synchronizer are similar to the advantages already discussed hereinabove with reference to the different embodiments of the transmission device.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 4A is a plane view of the dog ring shown in FIG. 3, FIG. 4B is a plane view of a variant of the dog ring shown in FIG. 3.

DETAILED DESCRIPTION OF EXAMPLE EMBODIMENTS

Figure 1:
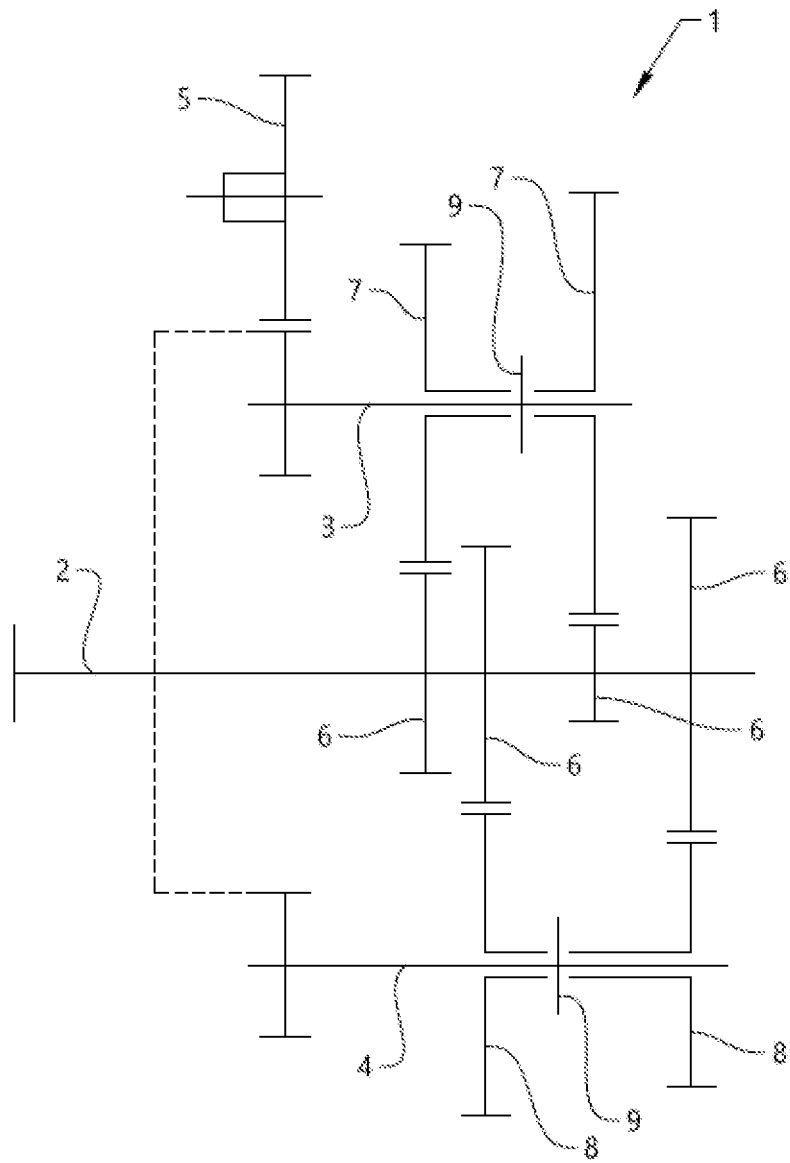
FIG. 1 is a schematic view of a vehicle transmission.

FIG. 1 is a schematic illustration of a vehicle transmission 1. This is an example of a transmission to which the transmission device according to the invention can be applied. As will be evident from the description herein, the invention can be applied to any transmission having a synchronizer with friction rings for synchronizing a first and a second rotating member relative to each other. Synchronization is usually performed when shifting gears and a sleeve is to be engaged with a gear wheel for transferring torque from an input shaft to an output shaft of the transmission.

The transmission illustrated in FIG. 1 has an input shaft 2 and a first output shaft 3 and a second output shaft 4. The input shaft 2 is driven and can be connected to any kind of motor via a clutch. The first and second output shafts 3, 4 are connected to a differential 5 which in turn is connected to the driven wheels of a vehicle. The input shaft 2 has gear wheels 6 which are connected to gear wheels 7 of the first output shaft 3 or gear wheels 8 of the second output shaft 4. The output shaft gear wheels 7, 8 are idle wheels, i.e. each gear wheel is journaled on the output shaft and can be rotationally locked to the output shaft by a synchronizer 9.

Figure 2:
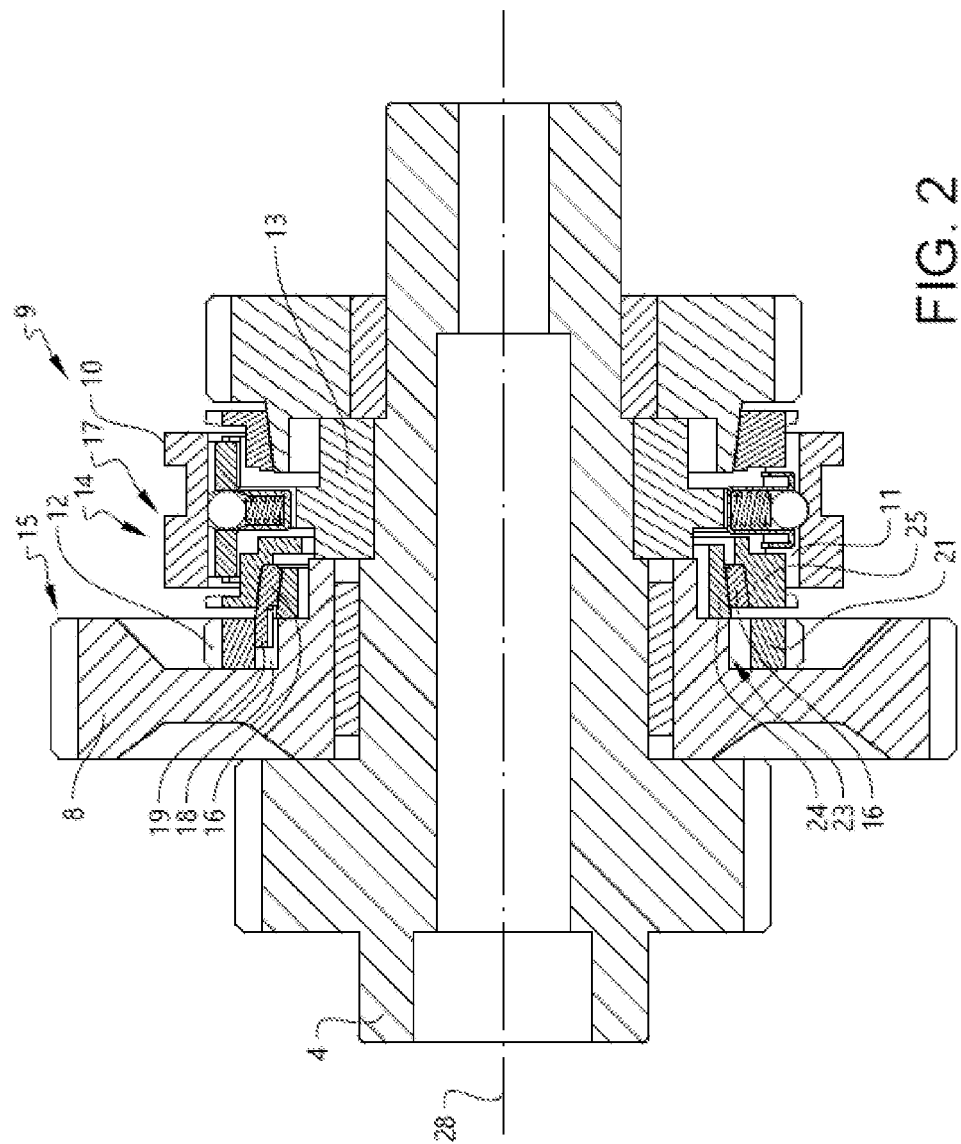
FIG. 2 is a cross section view of a synchronizer of a vehicle transmission.

FIG. 2 shows in a cross-section view an example of such a synchronizer 9. The synchronizer 9 has a sleeve 10 that is displaceable into engagement with an idle gear wheel 8. The sleeve 10 has internal teeth 11 and the idle gear wheel 8 has corresponding external teeth 12 such that the sleeve 10 and the idle gear wheel 8 can be rotationally locked to each other. The idle gear wheel 8 is engaged with another gear wheel (not shown in FIG. 2) arranged on the input shaft 2. The sleeve 10 is further connected to a hub 13 by means of a spline joint. The hub 13 is in turn rotationally locked relative to the output shaft 4. Thus, when the sleeve 10 and the idle gear wheel 8 are engaged, the idle gear wheel 8 and the output shaft 4 are rotationally locked relative to each other via the synchronizer 9 and torque can be transferred from the input shaft 2 to the output shaft 4.

The transmission device 14 according to the invention comprises a first rotating member 15 and a ring 16 for synchronizing the first rotating member 15 and a second rotating member 17 relative to each other.

Figure 3:
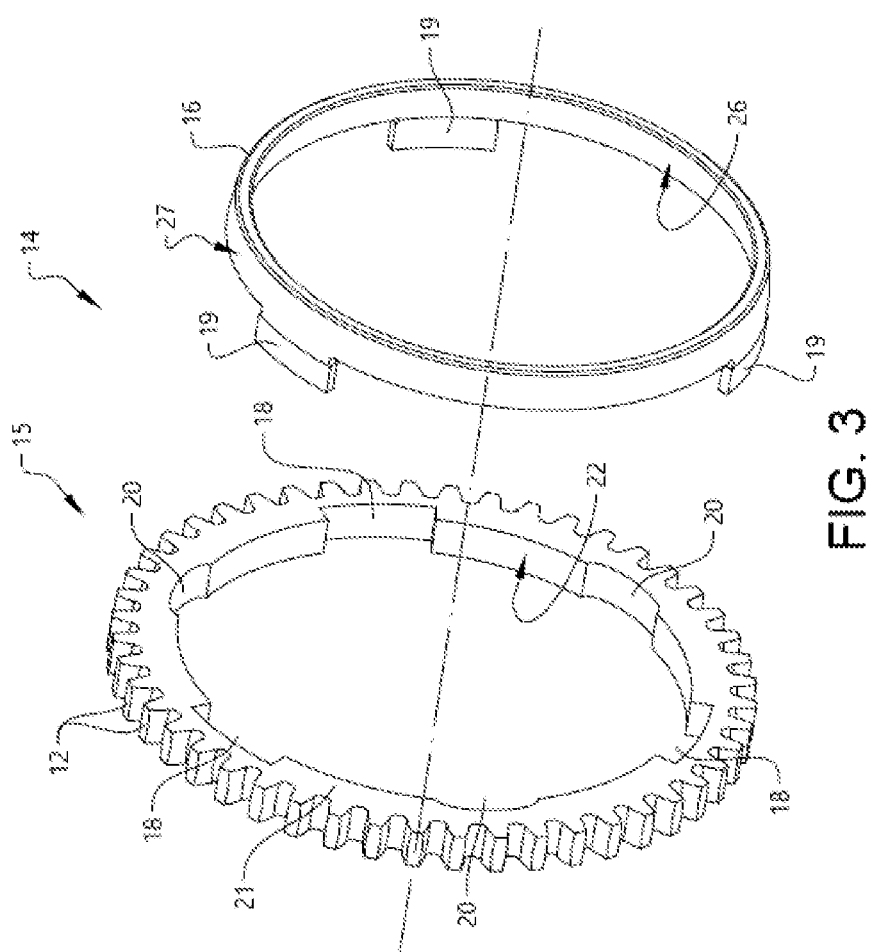
FIG. 3 is a perspective view of a transmission device according to the invention.

As can be seen also from FIG. 3, the first rotating member 15 is provided with a plurality of first recesses 18 for receiving a plurality of protrusions 19 provided on the synchronizing ring 16. The first rotating member 15 has one said first recess for each of said protrusions 19. The first rotating member 15 is provided with one or more second recesses 20 making the total number of first and second recesses 18, 20 exceeding the number of said protrusions 19. Preferably the first rotating member 15 has at least two, and often three or more said second recesses 20.

When the protrusions 19 are received in the first recesses 18, the first rotating member 15 and the synchronizing ring 16 are in engagement with each other. This means that torque can be transferred between the first rotating member 15 and the synchronizing ring 16. If the first rotating member 15 is rotated, this will cause the synchronizing ring 16 to rotate together with the first rotating member 15, and vice versa.

The first rotating member 15 and the synchronizing ring 16 are preferably arranged for engagement, i.e. the protrusions of the synchronizer ring are inserted into the first recesses of the first rotating member, by movement of the synchronizer ring and the first rotating member relative to each other in an axial direction.

Although the description hereinbelow, describes example embodiments where the synchronizing ring has three protrusions and the first rotating member has three first recesses, the invention is not limited to these embodiments. The synchronizing ring may have two or more protrusions, preferably at least three, and the first rotating member may have first recesses accordingly.

Further, the number of second recesses can of course be varied. The first rotating member will have at least one, preferably two and often it is suitable to provide the first rotating member with three or more second recesses.

With reference also to FIG. 2, the first rotating member 15 can comprise a gear wheel 8 and a gear wheel ring 21 or so-called dog ring. In such a case, the gear wheel 8 and the gear wheel ring 21 are rotationally locked relative to each other for transferring torque between the gear wheel 8 and the second rotating member 17 via the gear wheel ring 21. The gear wheel ring 21 has preferably an inner radial surface 22 designed with said first recesses 18 and said one or more second recesses 20. The gear wheel 8 has preferably an outer radial surface 23 onto which the gear wheel ring 21 is arranged. Hereby the recesses 18, 20 or so-called windows are created in the interface between the gear wheel 8 and the gear wheel ring 21.

The gear wheel 8 and the gear wheel ring 21 can be welded together. The welding seams are then suitably arranged along the circumferential parts of the interface between the gear wheel and the gear wheel ring not showing any said first or second recess.

The gear wheel ring 21 is suitably connectable to the second rotating member 17 such that the gear wheel ring 21 and the second rotating member 17 are rotationally locked relative to each other. For this purpose, the gear wheel ring 21 can be provided with teeth 12 for engagement with the second rotating member. As illustrated in the example embodiment in FIG. 2, where the second rotating member 17 is the sleeve 10, the sleeve 10 has internal teeth 11 and the gear wheel ring or dog ring 21 has external teeth 12.

The synchronizing ring 16 can be an intermediate ring to be arranged between an internal ring 24 and outer blocking ring 25. Further, the synchronizing ring 16 can be conical with an inner conical surface 26 and an outer conical surface 27.

In FIG. 3 the recesses (also called windows) of the first rotating member 15 and the protrusions (also called cams) of the synchronizing ring 16 are illustrated more in detail.

Please note that in FIGS. 3 and 4A-4C, the first rotating member is illustrated as a dog ring providing the first and second recesses. The first rotating member will suitably also include the gear wheel as described hereinabove, though the gear wheel is omitted in these figures.

During synchronization, the protrusions 19 are inserted into the recesses 18 for engaging the first rotating member 15 and the synchronizing ring 16 with each other. By friction between the synchronizing ring 16 and other rings of the synchronizer, the speeds of the first rotating member 15 and the second rotating member 17 are synchronized.

In the example embodiment illustrated in FIG. 3, the synchronizer ring 16 has three protrusions 19. The number of protrusions 19 of the ring can be varied and adapted to the current design and torque to be transferred during synchronization.

The total number of first and second recesses 18, 20 of the first rotating member 15, exceeds the number of protrusions 19 of the synchronizer ring 16. In the example embodiment illustrated in FIG. 3, the dog ring has three first recesses 18 for receiving the protrusions of 19 the synchronizer ring. Further, the dog ring 21 has three second recesses 20.

With reference to FIG. 4A, the first recesses 18 are suitably arranged such that a circumferential distance between two adjacent first recesses is substantially the same for all first recesses 18. In other words, the angle θ between two adjacent first recesses 18 is substantially the same for all first recesses. In this example embodiment, the dog ring 21 has three first recesses, and θ=60°. Further, the first recesses 18 are arranged substantially at the same distance from the centre 28 of the dog ring 16. In other words, all recesses are arranged along a circumferential line 29 defined by one and the same radius R.

The second recesses 20 are preferably arranged symmetrically along a circumferential line 29 of the first rotating member 15. This circumferential line can be the same line along which the first recesses are arranged. Please note that the circumferential line does not necessarily have to be an outer boundary of the current component. The position of the circumferential line is determined by the current distance to the centre of the dog ring, i.e. the radius R.

In the same way as for the first recesses, a symmetric pattern of the second recesses 20 can be obtained by arranging the second recesses 20 such that a circumferential distance between two adjacent second recesses 20 is substantially the same for all second recesses 20.

Furthermore, the first recesses 18 and second recesses 20 can suitably be arranged in alternating manner along a circumferential line 29 of the first rotating member 15, i.e. each first recess 18 is followed by a second recess 20, and vice versa, when looked in a circumferential direction.

In the example embodiment illustrated in FIG. 4A, the first recesses 18 and the second recesses 20 are arranged along the same circumferential line 29 substantially at the same distance R from a rotation axis 28 of the first rotating member 15. The centre of the dog ring corresponds to the rotation axis of the first rotating member (and of the output shaft 4).

In the example embodiment illustrated in FIGS. 3 and 4A, the first recesses 18 have substantially the same shape and size. Further, the protrusions 19 of the synchronizer ring 16 have substantially the same shape and size. Thus, any protrusion can be received by any first recess.

The second recesses 20 have substantially the same shape and size, but each of the second recesses is shaped or positioned in a way preventing any said protrusion 19 to be functionally received therein. In other words; the second recesses 20 have a shape and/or position not matching with the shape and/or position of the protrusions 19.

FIG. 4B shows a variant of the wheel gear ring or dog ring 21b where the first recesses 18 and said one or more second recesses 20b have substantially the same shape and size. In other words, the three first recesses 18 and the three second recesses 20b have been designed to constitute six similar recesses. Each of the second recesses 20b is shaped and positioned in a way enabling one said protrusion 19 of the synchronizing ring 16 to be functionally received therein.

Figure 4C:
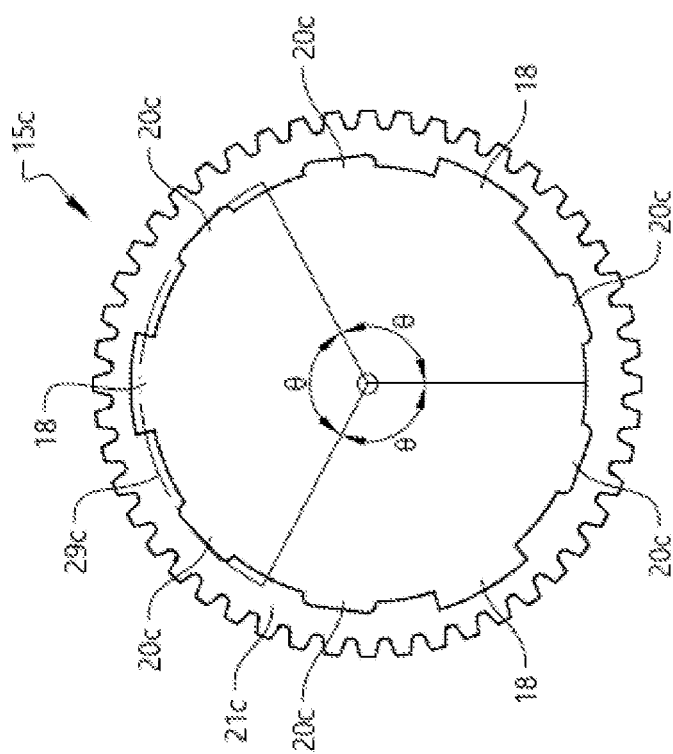
FIG. 4C is a plane view of a further variant of the dog ring shown in FIG. 3.

FIG. 4C shows a further variant of the wheel gear ring or dog ring 21c having three first recesses 18 and six second recesses 20c. In this case the circumferential distance between each pair of second recesses 20c is same for all pairs. This means that even in this case the second recesses 20c are arranged symmetrically along a circumferential line 29c of the first rotating member 15c, although the distance between two recesses of one and the same pair may be different from the distance between two pairs.

It is to be understood that the present invention is not limited to the embodiments described above and illustrated in the drawings; rather, the skilled person will recognize that many changes and modifications may be made within the scope of the appended claims.

What is claimed is:

1. A transmission device comprising a first rotating member and a ring for synchronizing the first rotating member and a second rotating member relative to each other, the first rotating member being provided with a plurality of first recesses for receiving a plurality of protrusions provided on the synchronizing ring, the first rotating member having one said first recess for each of said protrusions, wherein the first rotating member is provided with one or more second recesses making the total number of first and second recesses exceeding the number of said protrusions, and wherein the first rotating member comprises a gear wheel having gear teeth and a gear wheel rind having gear teeth, the gear wheel and gear wheel rind being rotationally locked relative to each other for transferring torque between the gear wheel and the second rotating member via the gear wheel ring.

2. A transmission device according to claim 1, wherein the first recesses are arranged such that a circumferential distance between two adjacent first recesses is substantially the same for all first recesses.

3. A transmission device according to claim 2, wherein the second recesses have substantially the same shape and size.

4. A transmission device according to claim 1, wherein the first rotating member has at least two said second recesses.

5. A transmission device according to claim 4, wherein the second recesses are arranged symmetrically along a circumferential line of the first rotating member.

6. A transmission device according to claim 5, wherein the second recesses are arranged such that a circumferential distance between two adjacent second recesses is substantially the same for all second recesses.

7. A transmission device according to claim 4, wherein the first recesses and the second recesses are arranged in alternating manner along a circumferential line of the first rotating member.

8. A transmission device according to claim 1, wherein the first recesses and said one or more second recesses are arranged along the same circumferential line substantially at the same distance from a rotation axis of the first rotating member.

9. A transmission device according to claim 1, wherein the first recesses have substantially the same shape and size.

10. A transmission device according to claim 9, wherein the first recesses and said one or more second recesses have substantially the same shape and size.

11. A transmission device according to claim 10, wherein each of said one or more second recesses is shaped and positioned in a way enabling one said protrusion to be functionally received therein.

12. A transmission device according to claim 1, wherein the first rotating member has at least three said first recesses for receiving said protrusions and at least three said second recesses.

13. A transmission device according to claim 12, wherein the synchronizing ring has exactly three said protrusions and the first rotating member has exactly three said first recesses for receiving said protrusions and exactly three said second recesses.

14. A transmission device according to claim 1, wherein the synchronizer ring and the first rotating member are arranged for engagement by movement of the synchronizer ring and the first rotating member relative to each other in an axial direction.

15. A transmission device according to claim 1, wherein the gear wheel ring has an inner radial surface designed with said first recesses and said one or more second recesses.

16. A transmission device according to claim 15, wherein the gear wheel has an outer radial surface onto which the gear wheel ring is arranged.

17. A transmission device according to claim 16, wherein the gear wheel and the gear wheel ring being welded together, welding seams being arranged along the circumferential parts of the interface between the gear wheel and the gear wheel ring not showing any said first recesses or second recesses.

18. A transmission device according to claim 1, wherein said gear wheel ring is connectable to the second rotating member such that the gear wheel ring and the second rotating member are rotationally locked relative to each other.

19. A transmission device according to claim 18, wherein the pear teeth on the gear wheel ring are provided for engagement with the second rotating member.

20. A transmission device comprising a first rotating member and a ring for synchronizing the first rotating member and a second rotating member relative to each other, the first rotating member being provided with a plurality of first recesses for receiving a plurality of protrusions provided on the synchronizing ring, the first rotating member having one said first recess for each of said protrusions, wherein the first rotating member is provided with one or more second recesses making the total number of first and second recesses exceeding the number of said protrusions, and wherein each of said one or more second recesses is shaped or positioned in a way preventing any said protrusion to be functionally received therein.

21. A transmission device comprising a first rotating member and a ring for synchronizing the first rotating member and a second rotating member relative to each other, the first rotating member being provided with a plurality of first recesses for receiving a plurality of protrusions provided on the synchronizing ring, the first rotating member having one said first recess for each of said protrusions, wherein the first rotating member is provided with one or more second recesses making the total number of first and second recesses exceeding the number of said protrusions, and wherein the first rotating member has an inner radial surface designed with said first recesses and said one or more second recesses.

22. A transmission device according to claim 21, wherein the gear wheel has an outer radial surface onto which the gear wheel ring is arranged.

\* \* \* \* \*